United States Patent [19]

Yanagisawa et al.

[11] Patent Number: 5,631,195
[45] Date of Patent: May 20, 1997

[54] GLASS COMPOSITION AND SUBSTRATE FOR PLASMA DISPLAY

[75] Inventors: Osamu Yanagisawa; Kenji Oda; Naoki Sugimoto, all of Yokohama; Yoshio Takegawa, Kawasaki; Akira Takada, Yokohama; Hideyo Osada, Yokohama; Haruo Aizawa, Yokohama; Koji Miura, Yokohama, all of Japan

[73] Assignee: Asahi Glass Company Ltd., Tokyo, Japan

[21] Appl. No.: 528,265

[22] Filed: Sep. 14, 1995

[30] Foreign Application Priority Data

Sep. 14, 1994 [JP] Japan .................. 6-220376

[51] Int. Cl.$^6$ ................. C03C 3/078; C03C 3/085; C03C 3/087
[52] U.S. Cl. ................. 501/72; 501/69; 501/70
[58] Field of Search .................. 501/69, 70, 72

[56] References Cited

U.S. PATENT DOCUMENTS

| | | | |
|---|---|---|---|
| 3,464,932 | 9/1969 | Connelly et al. | 501/69 |
| 3,808,154 | 4/1974 | Omori | 501/70 |
| 3,819,972 | 6/1974 | Sanner | 501/69 |
| 4,015,966 | 4/1977 | Weaver | 501/69 |
| 4,994,415 | 2/1991 | Imai et al. | 501/66 |
| 5,116,788 | 5/1992 | Dumbaugh, Jr. | 501/66 |
| 5,116,789 | 5/1992 | Dumbaugh, Jr. et al. | 501/66 |
| 5,326,730 | 7/1994 | Dumbaugh, Jr. et al. | 501/69 |
| 5,374,595 | 12/1994 | Dumbaugh, Jr. et al. | 501/66 |
| 5,459,109 | 10/1995 | Lapp | 501/66 |

FOREIGN PATENT DOCUMENTS

| | | |
|---|---|---|
| 3-40933 | 2/1991 | Japan . |
| 9611887 | 4/1996 | WIPO . |

*Primary Examiner*—Mark L. Bell
*Assistant Examiner*—Louis M. Troilo
*Attorney, Agent, or Firm*—Oblon, Spivak, McClelland, Maier & Neustadt, P.C.

[57] ABSTRACT

A glass composition comprising from 45 to 66 wt % of $SiO_2$, from 0 to 15 wt % of $Al_2O_3$, from 10 to 24 wt % of $Li_2O+Na_2O+K_2O$, from 14 to 26 wt % of $CaO+MgO+SrO+BaO+ZnO$, and from 0 to 1 wt % of $SO_3+Sb_2O_3$, said glass composition containing substantially no zirconia and having a strain point of at least 560° C. and a linear thermal expansion coefficient of at least $80\times10^{-7}$/°C. within a temperature range of from 50° to 350° C.

9 Claims, No Drawings

GLASS COMPOSITION AND SUBSTRATE FOR PLASMA DISPLAY

BACKGROUND OF THE INVENTION

FIELD OF THE INVENTION

The present invention relates to a glass composition suitable for substrates for display devices such as fluorescent character display tubes, plasma display panels, flat cathode ray tubes and liquid crystal display tubes.

As a glass substrate for plasma display, a soda lime glass having a strain point of about 510° C., formed by float process, is commonly used. A typical plasma display panel is produced by the following process.

Firstly, on a glass substrate for the display surface side, display electrodes will be printed, and dielectric layer will be printed thereon, followed by baking. Further, a protective film will be vapor-deposited on this dielectric layer. On the other hand, on the opposing rear-side glass substrate, Al, Ag or Ni electrodes, and stripe-shaped partition walls (low melting point glass) to prevent electric discharge between electrodes and to prevent color mixing of red-, green- and blue-phosphors, will be formed by baking at a temperature of from 500° to 600° C. Further, printed circuits will be formed, and red-, green- and blue-phosphors will be printed.

The display side and rear side glass substrates will be bonded by means of a low melting temperature glass frit within the same temperature range as the above-mentioned temperature, and a gas mixture of xenon and neon as the main discharge gas, will be sealed in to obtain a plasma display panel.

The glass substrate for plasma display is subjected to heat treatment at a temperature equal to or higher than the strain point of soda lime glass at a level of from 500° to 600° C., and thermal deformation is likely to take place. Therefore, when soda lime glass substrates are used, a 40 inch panel is almost at the limit, and it is substantially difficult to use soda lime glass substrates for high definition TV which requires a panel of a larger size with a high level of resolution.

A $ZrO_2$-containing glass is also known which undergoes a less degree of deformation by such heat treatment (Japanese Unexamined Patent Publication No. 40933/1991). However, this glass is susceptible to scratching, and it is necessary not to polish the glass or to polish with a due care not to form a substantial scratch mark. Further, even with a glass having no scratch mark, a scratch mark may form during the production process. Therefore, a due care will be required for handling in the process.

Each of these methods reduces the amount of glass substrate which can be produced per unit period of time. In other words, each method has a problem that the production cost of glass increases.

SUMMARY OF THE INVENTION

It is an object of the present invention to provide a glass composition which scarcely undergoes thermal deformation and which is hardly susceptible to scratching.

That is, the present invention provides a glass composition comprising from 45 to 66 wt % of $SiO_2$, from 0 to 15 wt % of $Al_2O_3$, from 10 to 24 wt % of $Li_2O+Na_2O+K_2O$, from 14 to 26 wt % of $CaO+MgO+SrO+BaO+ZnO$, and from 0 to 1 wt % of $SO_3+Sb_2O_3$, said glass composition containing substantially no zirconia and having a strain point of at least 560° C. and a linear thermal expansion coefficient of at least $80\times10^{-7}/°C.$ within a temperature range of from 50° to 350° C.

DETAILED DESCRIPTION OF THE PREFERRED EMBODIMENTS

Now, the reason for the definition of the composition of the glass composition of the present invention will be described.

In the present invention, if the glass composition contains $ZrO_2$ substantially, the glass tends to be susceptible to scratching, and the breakage frequency during the production process tends to be high, whereby the production yield will be poor. Therefore, the glass composition of the present invention contains substantially no zirconia. Here, "contains substantially no zirconia" means that the zirconia content is less than 0.2 wt %.

Further, if the glass composition contains $As_2O_3$ substantially, arsenic will dissolve in the polishing waste liquid resulting from polishing in the commercial production, whereby a substantial cost will be required for treatment of the waste liquid. Therefore, the glass composition preferably contains substantially no arsenic. Here, "contains substantially no arsenic" means that the $As_2O_3$ content is less than 0.1 wt %.

Further, if the glass composition contains $B_2O_3$ substantially, the linear expansion coefficient tends to be small, and boron tends to evaporate during the production process, whereby it tends to be difficult to produce a uniform glass. Further, evaporated boron is likely to erode the bricks of the furnace. Accordingly, it is preferred that the composition does not substantially contain $B_2O_3$. Here, "does not substantially contain $B_2O_3$" means that the content is less than 0.1 wt %.

If the linear thermal expansion coefficient is less than $80\times10^{-7}/°C.$, within a temperature range of from 50° to 350° C., cracks are likely to form in the electrodes and the partition walls. Therefore, the linear thermal expansion coefficient is at least $80\times10^{-7}/°C.$, preferably at least $85\times10^{-7}/°C.$ Further, the linear thermal expansion coefficient is preferably less than $120\times10^{-7}/°C.$, more preferably less than $95\times10^{-7}/°C.$ If the strain point is less than 560° C., thermal deformation is likely to form during the heat treatment of e.g. electrodes and partition walls. Therefore, the strain point is usually at least 560° C., preferably at least 570° C.

$SiO_2$ is a main component for the glass. If the content of $SiO_2$ is less than 45 wt %, the chemical durability tends to be poor, particularly corrosion by hydrofluoric acid tends to be substantial. On the other hand, if it exceeds 66 wt %, the linear thermal expansion coefficient will be less than $80\times10^{-7}/°C.$ Therefore, the $SiO_2$ content is from 45 to 66 wt %. It is preferably within a range of from 50 to 63 wt % in order to obtain a higher strain point (at least 570° C.).

$Al_2O_3$ which may optionally be used, is a component which is effective to increase the strain point without substantially reducing the linear thermal expansion coefficient. If the content of $Al_2O_3$ exceeds 15 wt %, the liquidus temperature tends to be too high. Therefore, the content of $Al_2O_3$ is usually within a range of from 0 to 15 wt %, preferably from 0.5 to 12 wt %, more preferably from 5.5 to 10 wt %.

$Li_2O$, $Na_2O$ and $K_2O$ are components which are effective for adjusting the linear thermal expansion coefficient of glass or the viscosity at a high temperature. These components may not all be incorporated simultaneously. However, if their total content is less than 10 wt %, the linear thermal expansion coefficient tends to be less than $80\times10^{-7}/°C.$, and if it exceeds 24 wt %, it becomes difficult to bring the strain point to a level of at least 560° C. Therefore, their total content is within a range of from 10 to 24 wt %. The content of $Na_2O$ is preferably from 0 to 6 wt %, and the content of $K_2O$ is preferably from 0 to 0.5 wt %.

Among them, $K_2O$ has an effect of increasing the strain point, and its content is preferably from 4 to 20 wt %, particularly from 9 to 16 wt %.

SrO, BaO, ZnO, CaO and MgO may not all be incorporated simultaneously. However, if their total content is less than 14 wt %, it tends to be difficult to bring the strain point to a level of at least 560° C. On the other hand, if it exceeds 26 wt %, the strain point tends to be too low. Therefore, their total content is usually within a range of from 14 to 26 wt %, preferably from 17 to 23 wt %, more preferably from 18 to 20 wt %.

The content of CaO is preferably from 0 to 14 wt %, the content of MgO is preferably from 0 to 6 wt %, the content of BaO is preferably from 0 to 14 wt %, and the content of ZnO is preferably from 0 to 6 wt %.

Among them, SrO has an effect of increasing the strain point, and its content is preferably from 1 to 14 wt %, particularly from 4 to 10 wt %. Further, CaO is preferably contained in an amount of from 1 to 14 wt %.

$Sb_2O_3$ and $SO_3$ which may optionally be incorporated, are refining agents. If their total content exceeds 1 wt %, their effects of refining will be saturated. Therefore, their total content is within a range of from 0 to 1 wt %.

In addition to the above components, the following components may be incorporated.

$CeO_2$ may be incorporated for the purpose of suppressing browning which is likely to result when the glass is irradiated with X-rays. $TiO_2$ and $Bi_2O_3$ may be incorporated for the purpose of suppressing solarization which is likely to result when the glass is irradiated with ultraviolet rays. PbO has an effect of suppressing solarization, but even if it is added excessively, the effect will be saturated. Therefore, the content is preferably less than 0.3 wt %, more preferably less than 0.1 wt %. Further, the color of glass can be controlled by incorporating a small amount of $Fe_2O_3$, CoO, $Cr_2O_3$ or NiO.

On the other hand, it is preferred that fluorine, zirconium, boron, phosphorus and arsenic are not substantially contained, although they may be incorporated as impurities.

The glass composition of the present invention can be produced by supplying glass batch formulated to have the desired composition, into a melting furnace, followed by vitrification and forming into a transparent and not substantially crystallized sheet glass having a predetermined thickness by float process.

Now, the present invention will be described in further detail with reference to Examples. However, it should be understood that the present invention is by no means restricted by such specific Examples.

EXAMPLES 1 to 6 and COMPARATIVE EXAMPLES 7 to 9

550 g of glass batch formulated to have the desired composition, were put into a platinum crucible and heated for 4.5 hours for vitrification in a furnace of 1510° C. while stirring from time to time. Then, the molten glass was cast in a graphite mold and then annealed to reduce strain. Table 1 shows the composition by weight % of oxides. The amounts of CoO and NiO were so small that they were represented by ppm.

With respect to such a sheet glass, the linear thermal expansion coefficient, the strain point, the brittleness, the temperature at $10^2$ poise, which is an index for the solubility, the temperature at $10^4$ poise, which is an index for formability, the liquidus temperature, the chemical durability and the electrical resistance were measured, and the results are shown in the respective columns in Table 1. Table 1 also shows Comparative Examples.

Various properties were measured as follows.

The brittleness was determined in such a manner that a Vickers indentator was pressed against a mirror-polished glass surface under a load of 500 g, whereupon the diagonal length (a) of the indentation and the crack length (C) were measured, and their ratio C/a was obtained. The larger the ratio C/a, the higher the brittleness [Sehgal et al. J. Mat. Sci. letters [14], p.167–169, 1995].

The chemical durability was represented by the weight reduction per unit area ($mg/cm^2$) when a test sample of 50 mm×50 mm×3 mmt was immersed in a 15 wt % HF aqueous solution at 40° C. for 90 seconds.

The linear thermal expansion coefficient is represented by a value within a temperature range of from 50° to 350° C., and the electrical resistance is represented by a logarithmic value of the resistance (unit: Ω·cm) at 150° C. Other physical properties were measured in accordance with methods which are commonly employed in the glass industry.

The liquidus temperatures of all glasses in Examples and Comparative Examples in Table 1, are all lower than the temperatures of the respective glasses at $10^4$ poise. This indicates that they can be formed by float process. The ratio C/a of the soda lime glass in Comparative Example 9 is lower than C/a of the glasses in Examples 1 to 8, which indicates that the strain point is low as compared with that of the glasses in the Examples, and such soda lime glass can not be used for a plasma display substrate of a large size with high resolution, although it is scarcely brittle. The glass in Comparative Example 10 is equivalent to the glasses in Examples 1 to 8 with respect to both the strain point and the linear expansion coefficient, and the ratio C/a is also small, which indicates that the glass is scarcely brittle. However, the temperature at $10^2$ poise is higher by as much as 200° C. than those of the glasses of Examples 1 to 8, which indicates that melting is very difficult. The ratio C/a of the glass in Comparative Example 11 which contains zirconia, is higher than the ratios C/a of the glasses in Examples 1 to 8, which indicates that it is readily brittle.

As shown by the foregoing Examples, the glass composition of the present invention has a high linear thermal expansion coefficient and a high strain point, and it can relatively easily be melted and scarcely brittle.

TABLE 1

| Composition | Examples | | | | | | | | Comparative Examples | | |
|---|---|---|---|---|---|---|---|---|---|---|---|
| | 1 | 2 | 3 | 4 | 5 | 6 | 7 | 8 | 9 | 10 | 11 |
| $SiO_2$ | 64.4 | 57.2 | 61.2 | 62.4 | 53.8 | 62.6 | 46 | 64.1 | 72.3 | 62.4 | 57.5 |

TABLE 1-continued

| Composition | Examples | | | | | | | | Comparative Examples | | |
|---|---|---|---|---|---|---|---|---|---|---|---|
| | 1 | 2 | 3 | 4 | 5 | 6 | 7 | 8 | 9 | 10 | 11 |
| $Al_2O_3$ | 1 | 5.6 | 5.7 | 6.1 | 5.6 | 6.1 | 15 | 4.2 | 2 | 17.1 | 7 |
| $Li_2O$ | 0 | 0 | 0 | 0 | 0 | 0.2 | 0 | 0.2 | 0 | 0 | 0 |
| $Na_2O$ | 0 | 0 | 0 | 0 | 1.0 | 0 | 3.2 | 1.4 | 12.5 | 12.2 | 0 |
| $K_2O$ | 11 | 10.6 | 13.4 | 11.6 | 9.4 | 11.6 | 19.1 | 10 | 1 | 3.8 | 4.3 |
| SrO | 13 | 5 | 5.8 | 9.2 | 4.3 | 9.2 | 6.7 | 0 | 0 | 0 | 6 |
| BaO | 0.4 | 12.8 | 0 | 0 | 11.4 | 0 | 0 | 7 | 0 | 0 | 9 |
| ZnO | 5 | 0 | 2.7 | 0.3 | 10.2 | 0.3 | 0 | 0 | 0 | 0 | 4 |
| CaO | 0 | 3.4 | 8.1 | 10 | 1.4 | 10.0 | 3.6 | 7.7 | 8 | 0.5 | 0 |
| MgO | 5 | 5 | 2.8 | 0 | 2.9 | 0 | 5 | 5 | 4 | 3.5 | 7 |
| $ZrO_2$ | 0 | 0 | 0 | 0 | 0 | 0 | 0 | 0 | 0 | 0 | 2 |
| $CeO_2$ | 0.5 | 0 | 0 | 0 | 0 | 0 | 0 | 0 | 0 | 0 | 3 |
| $TiO_2$ | 0.4 | 0 | 0.1 | 0 | 0 | 0 | 0 | 0 | 0 | 0 | 0 |
| PbO | 0 | 0.2 | 0 | 0 | 0 | 0 | 0 | 0 | 0 | 0 | 0 |
| $Bi_2O_3$ | 0 | 0 | 0 | 0 | 0 | 0 | 0.3 | 0 | 0 | 0 | 0 |
| $Fe_2O_3$ | 0 | 0 | 0 | 0 | 0 | 0 | 0.2 | 0.1 | 0 | 0 | 0 |
| CoO (ppm) | 18 | 0 | 0 | 0 | 0 | 0 | 0 | 0 | 0 | 0 | 0 |
| NiO (ppm) | 140 | 0 | 0 | 0 | 0 | 0 | 0 | 0 | 0 | 0 | 0 |
| $SO_3$ | 0.1 | 0.2 | 0.2 | 0 | 0 | 0 | 0.4 | 0 | 0.2 | 0 | 0 |
| $Sb_2O_3$ | 0.2 | 0 | 0 | 0.4 | 0 | 0 | 0.5 | 0.3 | 0 | 0.5 | 0.2 |
| Linear expansion coefficient ($\times 10^{-7}$/°C.) | 82 | 85 | 85 | 82 | 83 | 83 | 116 | 82 | 85 | 88 | 82 |
| Strain point (°C.) | 567 | 587 | 587 | 594 | 571 | 586 | 570 | 572 | 511 | 576 | 589 |
| Brittleness | 2.61 | 2.97 | 2.62 | 2.64 | 2.91 | 2.65 | 3.07 | 2.63 | 2.43 | 2.43 | 3.16 |
| Temp. at $10^2$ poise | 1565 | 1560 | 1560 | 1565 | 1549 | 1550 | 1518 | 1564 | 1470 | 1770 | 1504 |
| Temp. at $10^4$ poise | 1145 | 1161 | 1161 | 1155 | 1169 | 1143 | 1118 | 1165 | 1044 | 1270 | 1155 |
| Liquidus temp. (°C.) | 1125 | 1110 | 1110 | 1107 | 992 | 1107 | 1042 | 1112 | 1040 | 1230 | 1150 |
| Chemical durability | 2.2 | 4.3 | 3.4 | 3.3 | 6.9 | 3.3 | 10 | 0.8 | 4.2 | 3.8 | 5.2 |
| Electrical resistance | 11.4 | 11.7 | 11.3 | 11.5 | 12.4 | 11.5 | 11.6 | 11 | 8.8 | 8.4 | 10.9 |

The glass composition of the present invention is scarcely brittle and has a strain point of at least 560° C. and a linear thermal expansion coefficient close to that of soda lime glass, whereby it can be used for an application where a high strain point is required among glass substrates for which soda lime glass has heretofore been used. It is particularly useful for a plasma display substrate, but it is also useful for other substrates such as substrates for e.g. liquid crystal devices. Further, the glass composition of the present invention has a high electrical resistance of at least $10^{11}$ Ω·cm at 150° C., and it is accordingly useful for an application where electrical insulation is particularly required.

What is claimed is:

1. A glass composition comprising from 50 to 66 wt % of $SiO_2$, from 0 to 15 wt % of $Al_2O_3$, from 0 to 13.4 wt % of $K_2O$, from 10 to 24 wt % of $Li_2O+Na_2O+K_2O$, from 0 to 7 wt % of BaO, from 14 to 26 wt % of CaO+MgO+SrO+BaO+ZnO, and from 0 to 1 wt % of $SO_3+Sb_2O_3$, said glass composition containing substantially no zirconia and having a strain point of at least 560° C. and a linear thermal expansion coefficient of at least $80\times10^{-7}$/°C. within a temperature range of from 50° to 350° C.

2. The glass composition according to claim 1, which has a linear thermal expansion coefficient of from $80\times10^{-7}$ to $120\times10^{-7}$/°C. within a temperature range of from 50° to 350° C.

3. The glass composition according to claim 1, which has a linear thermal expansion coefficient of from $80\times10^{-7}$ to $95\times10^{-7}$/°C. within a temperature range of from 50° to 350° C.

4. The glass composition according to claim 1, wherein the liquidus temperature is lower than the temperature at which the viscosity is $10^4$ poise.

5. The glass composition according to claim 1, which contains substantially no arsenic.

6. The glass composition according to claim 1, which comprises from 50 to 63 wt % of $SiO_2$, from 5.5 to 15 wt % of $Al_2O_3$, from 0 to 6 wt % of $Na_2O$, from 1 to 13.4 wt % of $K_2O$, from 0 to 0.5 wt % of $Li_2O$, from 10 to 24 wt % of $Li_2O+Na_2O+K_2O$, from 0 to 14 wt % of CaO, from 0 to 6 wt % of MgO, from 1 to 14 wt % of SrO, from 0 to 7 wt % of BaO, from 0 to 6 wt % of ZnO, from 14 to 26 wt % of CaO+MgO+SrO+BaO+ZnO, and from 0 to 1 wt % of $SO_3+Sb_2O_3$, and which contains substantially no zirconia.

7. The glass composition according to claim 6, which has a strain point of at least 570° C.

8. A substrate for plasma display which is made of a glass composition comprising from 50 to 66 wt % of $SiO_2$, from 0 to 15 wt % of $Al_2O_3$, from 0 to 13.4 wt % $K_2O$, from 10 to 24 wt % $Li_2O+Na_2O+K_2O$, from 0 to 7 wt % of BaO, from 14 to 26 wt % of CaO+MgO+SrO+BaO+ZnO, and from 0 to 1 wt % of $SO_3+Sb_2O_3$, said glass composition containing substantially no zirconia and having a strain point of at least 560° C. and a linear thermal expansion coefficient of at least $80\times10^{-7}$/°C. within a temperature range of from 50° to 350° C.

9. A substrate for plasma display which is made of a glass composition comprising from 50 to 63 wt % of $SiO_2$, from 5.5 to 15 wt % of $Al_2O_3$, from 0 to 6 wt % of $Na_2O$, from 1 to 13.4 wt % $K_2O$, from 0 to 0.5 wt % $Li_2O$, from 10 to 24 wt % $Li_2O+Na_2O+K_2O$, from 0 to 14 wt % of CaO, from 0 to 6 wt % of MgO, from 1 to 14 wt % of SrO, from 0 to 7 wt % of BaO, from 0 to 6 wt % of ZnO, from 14 to 26 wt % of CaO+MgO+SrO+BaO+ZnO, and from 0 to 1 wt % of $SO_3+Sb_2O_3$ and which contains substantially no zirconia.

* * * * *